(12) United States Patent
Lang et al.

(10) Patent No.: US 11,854,750 B2
(45) Date of Patent: Dec. 26, 2023

(54) ELECTROLYTE CAPACITOR COMPRISING ISOLATED EDGES

(71) Applicant: Solaredge Technologies Ltd., Herzeliya (IL)

(72) Inventors: Joel Lang, Givataim (IL); Ronit Romm, Jerusalem (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 18/075,763

(22) Filed: Dec. 6, 2022

(65) Prior Publication Data
US 2023/0096578 A1 Mar. 30, 2023

Related U.S. Application Data

(62) Division of application No. 17/110,450, filed on Dec. 3, 2020, now abandoned.

(60) Provisional application No. 62/942,828, filed on Dec. 3, 2019.

(51) Int. Cl.
| | |
|---|---|
| *H01G 9/045* | (2006.01) |
| *H01G 9/048* | (2006.01) |
| *H01G 9/00* | (2006.01) |
| *H01G 9/15* | (2006.01) |
| *H01G 9/055* | (2006.01) |

(52) U.S. Cl.
CPC ........ *H01G 9/045* (2013.01); *H01G 9/0029* (2013.01); *H01G 9/055* (2013.01); *H01G 9/151* (2013.01); *H01G 9/048* (2013.01)

(58) Field of Classification Search
CPC ...... H01G 9/04; H01G 9/9151; H01G 9/9048; H01G 9/045
See application file for complete search history.

(56) References Cited

U.S. PATENT DOCUMENTS

| | | |
|---|---|---|
| 3,919,604 A | 11/1975 | Alwitt et al. |
| 5,450,279 A | 9/1995 | Yoshida et al. |
| 6,678,559 B1 | 1/2004 | Haeg et al. |

(Continued)

FOREIGN PATENT DOCUMENTS

| | | |
|---|---|---|
| CN | 209388889 U | 9/2019 |
| EP | 1168388 A2 | 1/2002 |

(Continued)

OTHER PUBLICATIONS

Apr. 12, 2021—European Search Report—EP 20211428.6.

*Primary Examiner* — David M Sinclair
(74) *Attorney, Agent, or Firm* — Banner & Witcoff, Ltd.

(57) ABSTRACT

A composite electrode foil roll for manufacturing an electrolytic capacitor, including: bands of electrode foils; strips of an isolating material positioned along a width of the composite electrode foil roll at a plurality of locations. The plurality of locations are at equal distances and correspond to a length of an inner cavity of a case of the electrolytic capacitor. The bands of electrode foils and strips of an isolating material are alternating. A method of manufacturing the composite electrode foil roll including alternating bands of electrode foils and strips of an isolating material. The strips are positioned along a width of the composite electrode foil roll at repeated locations. The repeated locations are at equal distances corresponding to a length of an inner cavity of a case of the electrolytic capacitor.

15 Claims, 3 Drawing Sheets

(56) References Cited

U.S. PATENT DOCUMENTS

| | | | |
|---|---|---|---|
| 7,531,010 | B1 | 5/2009 | Feger et al. |
| 2002/0047537 | A1* | 4/2002 | Chiavarotti ............ C25D 11/16 315/111.01 |
| 2009/0015987 | A1 | 1/2009 | Miura et al. |
| 2019/0006112 | A1 | 1/2019 | Aoyama et al. |
| 2019/0221372 | A1 | 7/2019 | Bowen et al. |

FOREIGN PATENT DOCUMENTS

| | | | |
|---|---|---|---|
| JP | 2943290 | B2 | 8/1999 |
| JP | 2007042932 | A | 2/2007 |

* cited by examiner

ELECTROLYTE CAPACITOR COMPRISING ISOLATED EDGES

RELATED APPLICATIONS

This application is a divisional of U.S. application Ser. No. 17/110,450, filed Dec. 3, 2020, which claims priority to U.S. Provisional Application No. 62/942,828, filed Dec. 3, 2019, the entire contents of each are incorporated herein by reference.

BACKGROUND

The field of technology relates to electrolytic capacitors.

Capacitors include electric components that store electrical energy as charge on parallel plates of conducting electrodes, such as an anode and a cathode. The electrodes may be separated by separators, such as isolation layers, dielectric layers, or electrolyte materials. Sheets of electrodes and separators may be rolled into various shapes to create internal elements of electrolytic capacitors. The shape of the rolled sheets may be cylindrical or prismatic. The internal elements may be packed in an inner cavity of a case, such as a can closed with a cap or a sealed pouch. The internal elements may also include tabs configured to electrically connect (e.g., by soldering, welding, or pressing) the electrodes to terminals traversing the case of the capacitor. The internal elements may also include leads connected to the electrodes and/or tabs, and the leads may extend externally from the case.

The manufacturing of electrolytic capacitors may be performed in a series of steps. For example, electrolytic capacitors with a cylindrical shape case may be manufactured with the following steps: etching, forming, slitting, winding/leading, impregnation with electrolyte, assembly, finishing, aging, inspection packaging, and/or shipping. Aluminum foils or sheets may be etched to produce the electrodes of the capacitor. The step of etching may increase the surface area of the electrodes. The step of forming may include developing a passivation layer on the surface of the foils that may act as a dielectric between the anode and cathode. The step of slitting may include cuffing the foils along the direction the foils will be rolled to form bands of aluminum foil. The step of winding/leading may include winding the cut foils (such as anode and cathode) with other elements (e.g., a separator, leads, protruding, and/or tabs) to produce the capacitor internal elements. The step of impregnation with electrolyte may include impregnating electrolyte into the separator. The steps of assembly and finishing may include inserting the internal elements into a case and sealing an end of the case with a plug (e.g., with a rubber packing, a rubber Bakelite cap, or a molded plastic plug). The seal may include terminals for electrical connections, and/or mechanical stabilization.

SUMMARY

The following summary is a short summary of some of the inventive concepts for illustrative purposes only and is not an extensive overview, and is not intended to identify key or critical elements, or to limit or constrain the inventions and examples in the detailed description. One skilled in the art will recognize other novel combinations and features from the detailed description.

A capacitor manufacturing method described herein includes a process for electrical isolation of foil edges after slitting the edges along a length of a foil. The process for electrical isolation may include a coating process to coat the edges with an isolating material. A manufacturing machine or device that incorporates a coating process may be positioned in the manufacturing line such that the exposed cut edges of the foils undergo a coating with an electrical and/or chemical isolating material. The isolating material may coat both edges of the cut foil, and be incorporated on the anode foil, the cathode foil, or both foils.

As noted above, this summary is merely a summary of some of the aspects and features described herein. It is not exhaustive, and it is not to be a limitation on the claims.

BRIEF DESCRIPTION OF THE DRAWINGS

Certain features, aspects, and advantages of the present disclosure will become better understood with regard to the following description, claims, and drawings. The present disclosure is illustrated by way of example, and not limited by, the accompanying figures. In the drawings, like numerals reference similar elements.

DESCRIPTION

Figure 1:
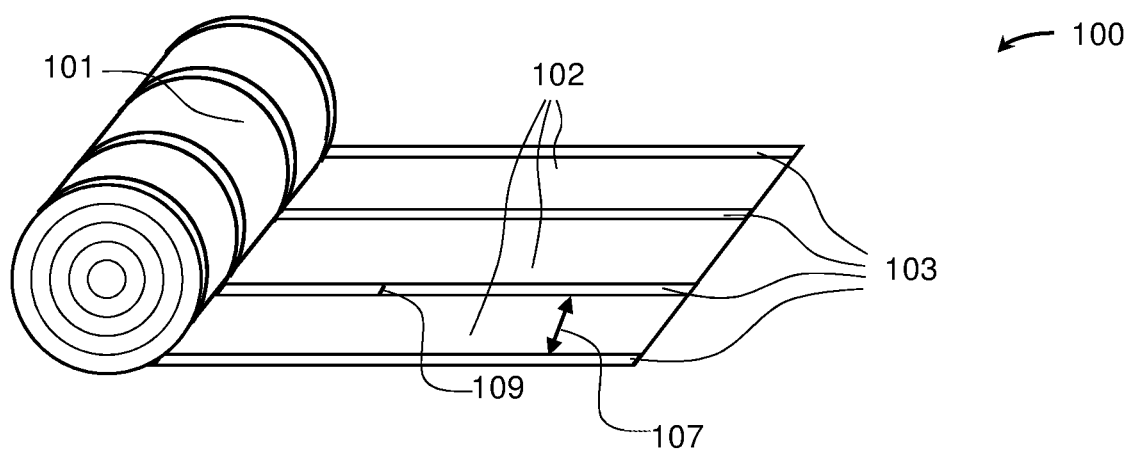
FIG. 1 shows an example of a combined foil with both bands of conducting material and isolating strips.

As used herein, a "band" may be a length of conducting material (e.g., aluminum foil). As used herein, a "strip" may be a length of electrically isolating material, typically found between two bands of conducting material and/or along an outer edge of a foil. As used herein, an "edge" of the foil may refer to the long edge of the aluminum foil. The foil may be cut from a mother roll such that the long edge of the foil is at a predetermined length. The resulting rectangle of foil may have a long edge along the slitting direction and a short edge along the cut direction. The long edge may be spirally wound around a spindle to create a cylindrical shape, and the short cut edge may be parallel to the cylinder axis. As used herein, a "case" may be a can/pouch or cap/seal.

A product is described herein, having isolation coatings along the edges of its electrode. A manufacturing method for such a product is also described. After the slitting of a raw aluminum foil, a layer of isolating material may be deposited on the exposed edges of raw aluminum foil caused by the slitting. The material used for isolating material may be selected from polymers, resins, ceramics, and/or oxides. The isolation layer may be deposited on the edges along a length of the slit foil by a machine or device that coats the edges with the isolating material (e.g., after the foil is slit and before the foil is spirally wound into a cylindrical capacitor internal element form).

In some examples, the isolation of the edges may be performed by manufacturing a combined foil that has both strips of isolating material (e.g., an isolating polymer) and bands of conducting material. The strips of isolating material may be narrow strips (e.g., 1-5 millimeters wide or 1-3 millimeters wide). The distance from one band to another band in the combined foil may correspond to the height of a cylindrical capacitor. When this combined foil is used to manufacture the capacitors, the slitting may be performed at the locations of the strips of isolating material, thus not exposing any raw conducting material (e.g., un-passivated or unformed aluminum). For example, an isolating material (e.g., isolating polymer) may be embedded in the conducting material of the combined foil to form strips of isolating material. The slitting of the combined foil may be performed along a length of the foil at the locations of the strips of isolating material. A three-dimensional multi-material printer may produce a combined foil of aluminum bands, with isolation strips along the length of the combined foil (e.g., with the aluminum bands in parallel to the isolation strips). The combined foil may be produced by printing narrow (e.g., between 1 and 5 millimeters wide) strips of a photopolymer between the aluminum bands. The strips and bands may be positioned on the combined foil such that the slitting of the combined foil cuts only the isolating strips and does not expose any raw conducting material (e.g., raw aluminum). The combined foil may be produced by extruding alternating conducting material slabs (or rods) and isolating material slabs (or rods) together.

A combined foil may also be manufactured by using a spray deposition of an aluminum material together with an inkjet deposition of a photopolymer material in narrow strips along the length of the combined foil (e.g., in the rolled direction—tangential to the foil roll axis). For example, a multiple material inkjet three-dimensional printer may deposit an aluminum powder including a photopolymer binder, and narrow strips of isolating photopolymer. Ultraviolet light may be used to cross-link the photopolymer binder and/or the isolating photopolymer to produce a combined foil with bands of conducting material and regular strips of isolating material. A combined foil may also be manufactured by hot rolling alternating aluminum rods and polymer wires.

As another example, a combined foil may be formed by first cutting a foil of conducting material into bands of conducting material corresponding to the length of the capacitor. A polymer adhesive material may be applied to the edges of the bands to combine them into a combined foil with bands of conducting material and narrow isolating strips in between.

The isolating material may increase the lifetime of the capacitors by preventing the raw, exposed aluminum from generating hydrogen, such as during the aging of the capacitor, during operation of the capacitor, and/or near the end-of-life of the capacitor.

Reference is now made to FIG. 1, which shows an example combined foil 100 with bands of conducting material 102 and strips of isolating material 103. Isolating strips 103 are located along a length of the combined foil 100 at future slit locations (e.g., positions along a length of the combined foil 100 designated for a subsequent slitting of the combined foil 100). The width 109 of the isolating strips are smaller than the width 107 of the bands of conducting material 102. The rolled portion 101 of the combined foil 100 may be manufactured to incorporate bands of conducting material 102 aluminum foil) separated from one another by alternating strips of isolating material 103 (e.g., a polymer). The ends of the combined foil 100 may incorporate the isolating strips 103 when needed.

Figure 2:
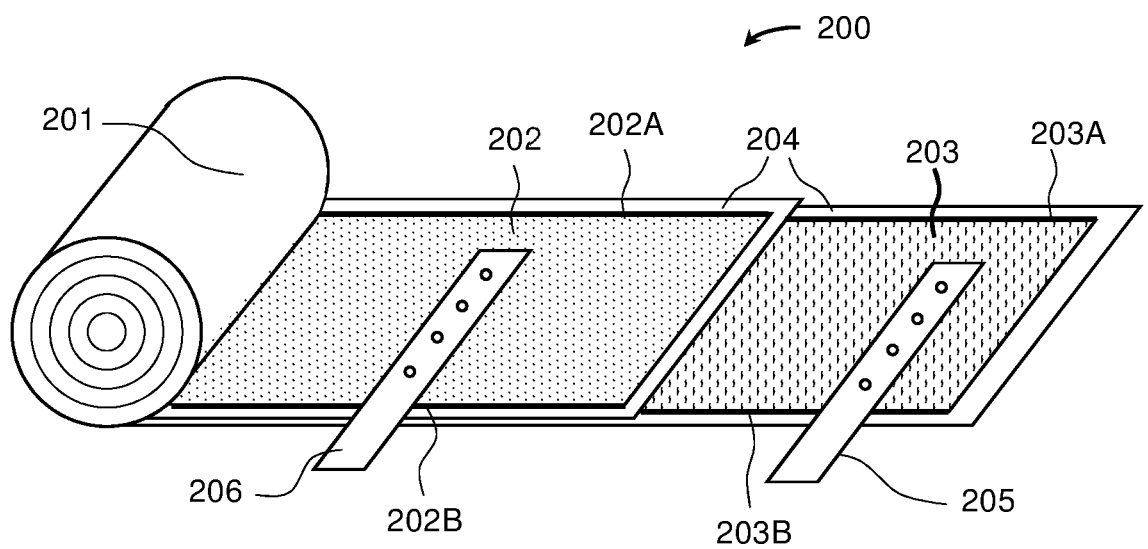
FIG. 2 shows example internal elements of a capacitor with edge-coated foil electrodes.

Reference is now made to FIG. 2, which shows an example internal element 200 of a capacitor with edge-coated foil electrodes. A rolled portion 201 of the element may be unrolled to expose an anode 202 and a cathode 203, with separators 204 in between them. An anode tab 206 may be cold welded to the anode 202, and a cathode tab 205 may be cold welded to the cathode 203. The long edges of anode 202 may be attached to an isolating material 202A and 202B. The long edges of cathode 203 may be attached to an isolating material 203A and 203B. The attached isolating material 202A, 202B, 203A, 203B may be formed by coating the slit edges after slitting an aluminum foil. The attached isolating material 202A, 2029, 203A, 203B may be formed by slitting the isolating material of a mother roll that is prefabricated with isolating material strips separating conducting bands of aluminum.

Figure 3:
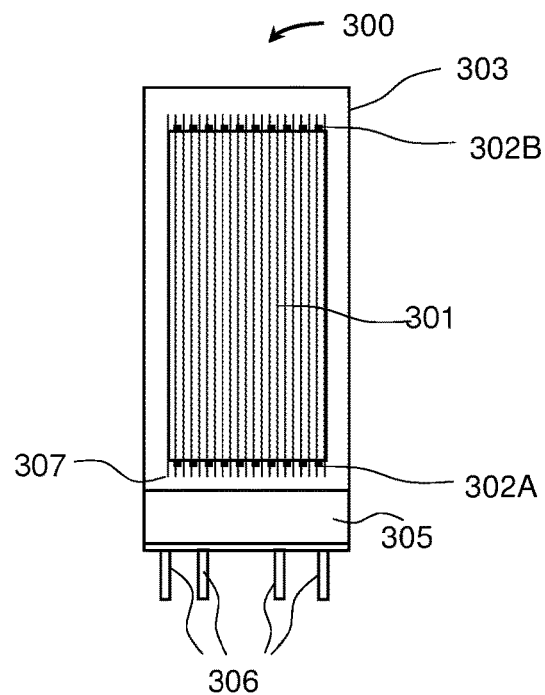
FIG. 3 shows an example capacitor with edge-coated foil electrodes.

Reference is now made to FIG. 3, which shows the cross-section of a capacitor 300 with edge-coated foil electrodes. The capacitor 300 may be produced from a foil with edges that have been coated with an isolating material. A can 303 may surround the internal element 301 of capacitor 300. Internal element 301 may include isolating material 302A and 302B along edges of the electrodes 311 and a separator 307. A cap 305 may seal the end of the can 303 and provides access to external electrodes 306 connected to the electrodes 311 inside the can 303.

Figure 4:
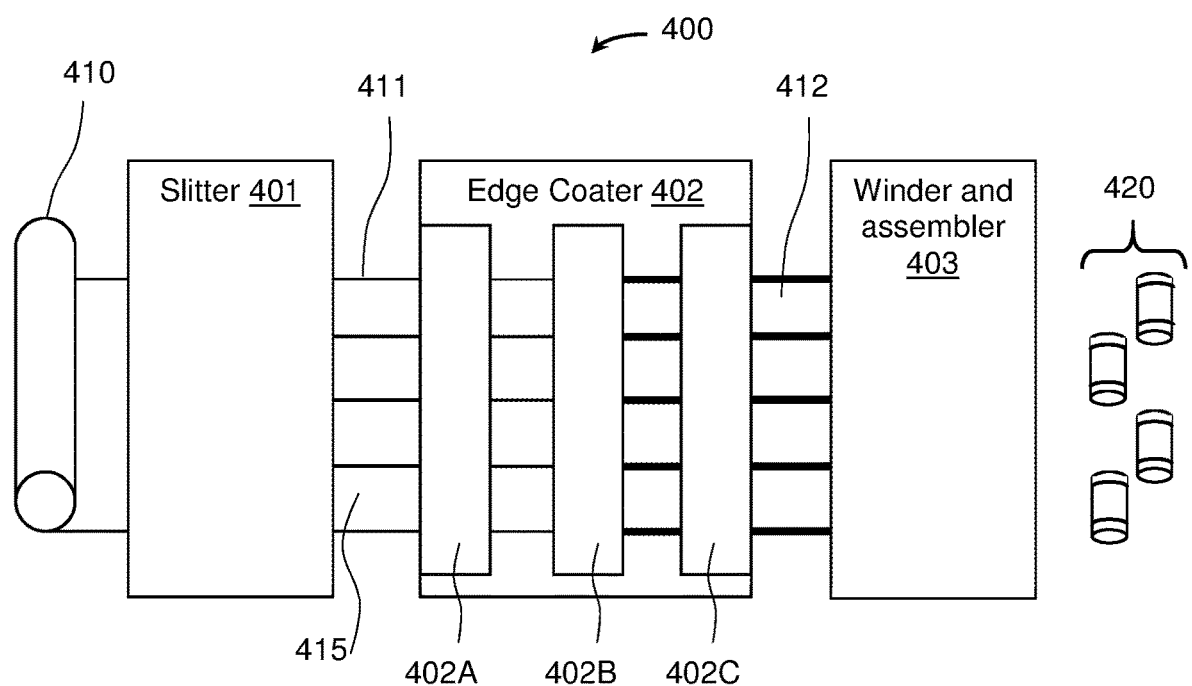
FIG. 4 shows an example system for manufacturing a capacitor with edge-coated foil electrodes.

Reference is now made to FIG. 4, which shows an example system 400 for manufacturing capacitors with edge-coated foil electrodes. Raw foil 410 (e.g., of conductor material, such as, aluminum foil) may be processed, including slitting by a slitter device 401 to form one or more slitted foil hands 415, such as foil band 411. The slit foil bands 415 may enter an edge coater device 402 for coating the edges of the foil bands 415 with an isolating material. The edge coater device 402 may include an entry gantry 402A for receiving the slitted foil bands, a coating apparatus 402B for coating the edges of the foil bands 415, and an exit gantry 402C for outputting the edge-coated foil bands 412. The edge-coated foil bands 412 may exit the exit gantry 402C of edge coater device 402, and may continue to one or more winder and assembler devices 403 for winding and assembly, System 400 may produce capacitors 420 incorporating isolating material on the foil bands' edges. The edge coater device 420 for coating the edges of the foil bands may be incorporated into a capacitor manufacturing line as a separate device, incorporated into an existing device (e.g., a slitting machine, and/or a winding machine), and/or performed as a step in the manufacturing of the foil (as isolation bands between strips of aluminum).

Figure 5:
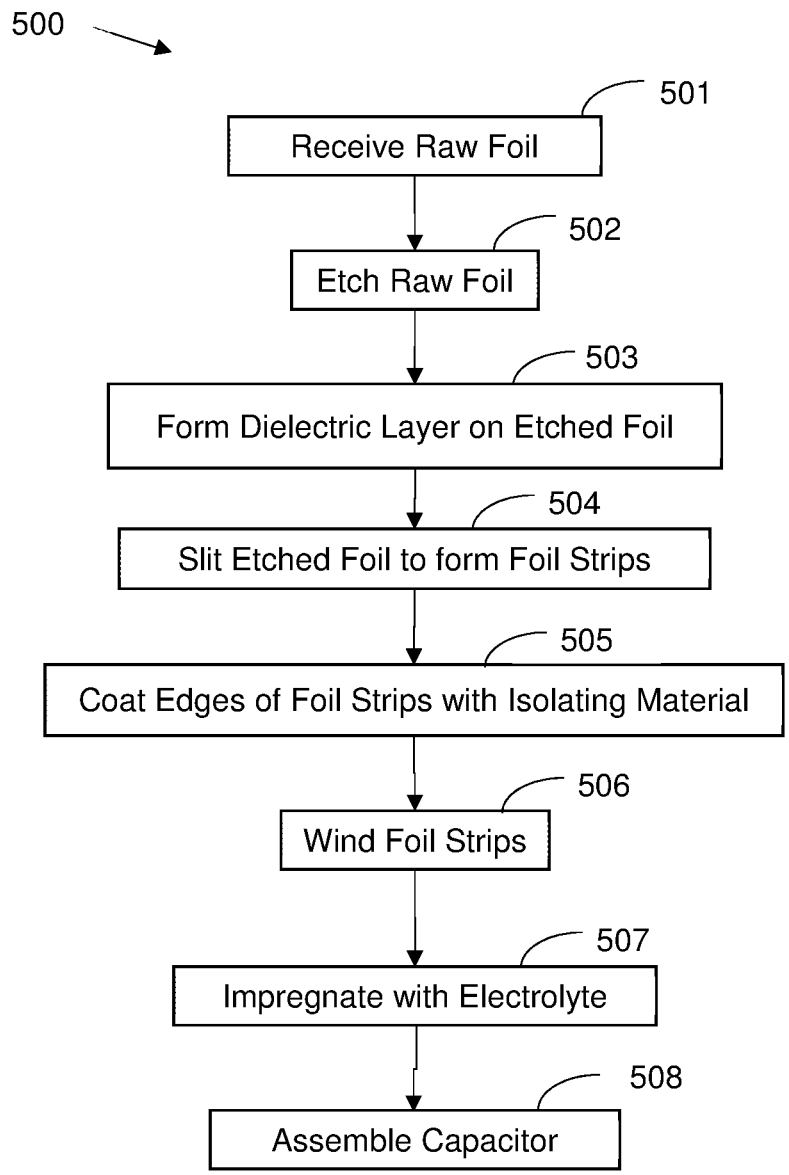
FIG. 5 shows a flowchart of an example method for coating edges of a foil.

Reference is now made to FIG. 5, which shows a flowchart of an example method 500 for coating edges after slitting and before winding. Raw foil may be received at step 501 and etched at step 502. The step of etching may increase the surface area of the electrodes. A dielectric or passivation layer is formed on the surface of the etched foil by anodizing the etched foil at step 503. Slits are formed in the etched foil at step 504 to form foil bands, and the exposed edges of the foil bands are coated with an isolating material at step 505. For example, the coating may be done by dipping the edges of the foil bands in a reservoir of heated liquid nylon and/or by spraying a thin coat of acrylic adhesive on the edges of the foil bands. The foil hands with the isolated edges are wound with separator and cathode onto a spool at step 506, and impregnated with electrolyte at step 507. The cylindrical capacitor's internal element is assembled at step 508.

Isolating materials suitable for electrical isolation of the foil bands' edges include, for example, polymers, ceramics, oxides, and/or resins. The isolating materials may be chemically neutral with regard to chemical interaction with the aluminum, electrolyte, hydrogen, and/or other elements/molecules found in the capacitor during manufacturing and operation. For example, a polymer used for isolating the foil bands' edges may be selected to avoid chemical reactions with boric acid used as an electrolyte. Capacitors using anhydrous electrolytes may use isolating edge coatings with an inert polymer material, such as a polycarbonate or an epoxy resin. A capacitor with a dimethylformamide (DMF), dimethylacetamide (DMA), or γ-butyrolactone (GBL) electrolyte may use an epoxy resin to coat the foil hands' edges before winding. Additives to the electrolyte may be used to prevent reactions with the electrolyte water.

The isolating material and coating properties may also be selected based on the working properties of the capacitor. Examples of the working properties may include a maximum operating voltage of the capacitor, a maximum operating temperature of the capacitor, and mechanical stress sustained by the capacitor. For example, when the maximum operating temperature of the capacitor is 105 degrees Celsius, an isolating material with a glass transition temperature above 125 degrees centigrade may be selected. If the maximum operating voltage of the capacitor is 500 volt direct current, an isolating material with a breakdown voltage of 700 volts may be selected. When the capacitor is expected to withstand strong vibrations and g-forces, an isolating material with a strong adhesion to the foil, high elastic modulus, and a high tensile strength may be selected.

The method used for application of the isolating strips or edge coating (e.g., of the layer of isolating material) may also determine the selection of the polymer of choice for a particular example electrolytic capacitor. For example, when the combined foil is created, including isolating strips using a materials printer, the isolating polymer may be selected as a photopolymer that hardens using ultraviolet light. For example, when the combined foil is created including isolating strips produced by molding, the polymer may be a polyethylene derivative. For example, molding a thermoplastic polymer into recesses between bands of a cut foil may produce isolating strips. For example, when the combined foil is manufactured by rolling, a series of alternating aluminum rods (for forming conducting bands) and nylon wires (for forming isolating strips) may be rolled together at a high temperature (such as a temperature above the nylon glass transition temperature) to form the isolating strips (e.g., nylon strips) and adhere them to the edges of the bands of isolating material (e.g., aluminum bands).

Other isolating materials that may be used for isolating the foil bands' edges include polypyrrole and its derivatives, polythiophene and its derivatives, polyethylene dioxythiophene and derivatives, propylene rubber, fluorocarbon resin, epoxy resin, polyacetal resin, thermoplastic resin, thermosetting resin, furan resin, phenol resin, urea resin, polyimide unsaturated polyester resins, urethane resins, acrylonitrile butadiene styrene (ABS) resin, polyethylene terephthalate resin, polybutylene terephthalate resin, nylon, polycarbonate, acrylic resin, polystyrene, polypropylene, polyethylene, natural rubber (NR), styrene-butadiene (SBR), isobutylene-isoprene rubber (IIR), vulcanized IIR with, for example, sulfur vulcanization, quinoid vulcanization, resin vulcanization, or peroxide vulcanization, polytetrafluoroethylene (PTFE), fluororesin, silicone resin such as polysiloxane, fluorine resin, Bakelite resin, and ceramic materials.

Other examples of isolating materials include tetrafluoroethylene (TFE), a polyester resin, a polyamide resin, an acid-modified polyolefin resin, polyphenylene sulfide, a liquid crystal polymer, engineering plastics, glass filler-containing glass filler-containing polybutylene terephthalate, glass filler-containing nylon or glass filler-containing polyphenylene sulfide, polyethylene terephthalate (PET), polybutylene terephthalate (PBT), polyphenylene sulfide (PPS), polyamide, resin-vulcanized butyl rubber, peroxide-vulcanized butyl rubber, ethylene-propylene rubber (EPT), polyolefin resin (e.g., ionomeric, or nylon 6, nylon 6.6, nylon 11, nylon 12, etc.), polypropylene resin, polyimide, crystalline engineering plastic, polyether ether ketone, polyether nitrile, ethylene propylene copolymers, ethylene-vinyl acetate copolymers, ethylene-acrylate ester copolymer (e.g., polyethylene naphthalate), polyesters (e.g., ethylene terephthalate/isophthalate copolymer), and a thermosetting adhesive polymer (i.e., a hot-melt adhesive).

In some cases, an adhesive may be used for the isolating strips, for example, epoxy-based adhesives, phenolic adhesives, acid-modified olefin resin adhesive, copolyamide adhesive, co-polyester based adhesive, etc. In some example, a combined isolating material may be used, such as a first layer of an adhesive and a second layer of an isolating polymer, a tape, or a first layer of an electrically isolating polymer and a second layer of an chemically isolating material.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

Clauses:

An electrolytic capacitor comprising an aluminum foil, where the aluminum foil comprises at least one edge covered by an isolating material.

A method of manufacturing for an electrolytic capacitor, comprising: slitting an aluminum foil after forming; coating at least one edge of the aluminum foil exposed by the slitting with an isolating material; and manufacturing an aluminum electrolytic capacitor using the edge isolated aluminum foil.

An aluminum foil for manufacturing an aluminum electrolytic capacitor comprising strips of an isolating material positioned along a length of the foil at locations corresponding to the length of an inner cavity of a case of an aluminum electrolytic capacitor.

A method of manufacturing for a combined foil, comprising at least one of: hot rolling aluminum rods with an alternating plurality of isolating material strips; three-dimensional printing bands of aluminum foil alternating with strips of an isolating material; or extruding a combined foil from alternating conducting aluminum slabs and isolating material slabs.

An aluminum electrolytic capacitor, where the aluminum foil electrode is configured as an anode.

An aluminum electrolytic capacitor, where the aluminum foil electrode is configured as a cathode.

An aluminum electrolytic capacitor comprising an anode aluminum foil and a cathode aluminum foil, where the anode aluminum foil and cathode aluminum foil each comprises at least one edge covered by an isolating material.

An aluminum electrolytic capacitor, where the isolating material is an electrically isolating material.

An aluminum electrolytic capacitor, where the isolating material is a chemically isolating material.

An aluminum electrolytic capacitor, where the isolating material is an electrically a chemically isolating material.

A capacitor comprising: a sealed case; external electrodes; and a spirally wound roll of electrode foils enclosed within the sealed case, where each electrode foil is coupled to at least one of the external electrodes and comprises: dielectric layers disposed on at least one surface of the electrode foil; and an isolating coating on at least one edge of the electrode foil.

A capacitor, where the dielectric layers are impregnated with an electrolyte.

A capacitor, where the at least one edge of the electrode foil is a longer edge of the electrode foil.

A capacitor, where at least one electrode foils is configured as an anode of the capacitor.

A capacitor, where at least one electrode foils is configured as a cathode of the capacitor.

A capacitor, where the isolating coating comprises an electrically isolating material.

A capacitor, where the isolating coating comprises a chemically isolating material.

A capacitor, further comprising tabs that connect electrode foils to the external electrodes.

A capacitor, where electrode foils comprises aluminum.

A capacitor, where a glass transition temperature of the isolating coating is higher than a maximum operating temperature of the capacitor; where a breakdown voltage of the isolating coating is higher than a maximum operating voltage of the capacitor; and where the isolating coating is adapted to sustain vibrations from the capacitor.

A method of manufacturing of a capacitor, comprising: forming electrode foils, where each electrode foil comprises dielectric layers on at least one surface of the electrode foil and an isolating coating on at least one edge of the electrode foil; spirally winding electrode foils to form a roll; coupling electrode foils to external electrodes of the capacitor; and enclosing the roll within a sealed case.

A method of manufacturing, where the forming electrode foils comprise: etching surfaces electrode foils; and depositing the dielectric layers on the etched surfaces.

A method of manufacturing, further comprising forming the isolating coating on the at least one edge of the electrode foil by depositing an isolating material on the at least one edge of the electrode foil.

A method of manufacturing, where the at least one edge of the electrode foil is a longer edge of the electrode foil.

A method of manufacturing, where the forming electrode foils comprise: cutting a combined foil comprising interleaving hands of conducting material and strips of isolating material, where lengths of the bands of conducting material and lengths of the strips of isolating material are positioned along a length of the combined foil; where widths of the strips of isolating material are narrower than widths of the hands of conducting material; and where the combined foil is cut along the lengths of the strips of isolating material.

A method of manufacturing, further comprising forming combination foil by hot rolling an interleaving arrangement of first wires and second wires, where the first wires comprise a conducting material and the second wires comprise an isolating material, and where widths of the first wires are wider than widths of the second wires.

A method of manufacturing, further comprising forming a combination foil by three-dimensional priming of the bands of conducting material and the strips of isolating material.

A method of manufacturing, where the strips of isolating material comprise an adhesive material; and where forming the combination foil comprises taping the bands of conducting material with the strips of isolating material.

A method of manufacturing, further comprising forming tabs that connect electrode foils to the external electrodes.

A method of manufacturing of a combined electrode foil, comprising at least one of: hot rolling a combined electrode foil from metal lengths with an alternating plurality of isolating material lengths; printing a combined electrode foil by three-dimensional printing bands of electrode foil alternating with strips of an isolating material; or extruding a combined electrode foil from alternating conducting metal slabs and isolating material slabs.

A method where the combined electrode foil is configured as an anode of an electrolytic capacitor.

A method where the combined electrode foil is configured as a cathode of an electrolytic capacitor.

An electrolytic capacitor comprising an anode foil and a cathode foil, where the anode foil and cathode foil each comprises at least one edge covered by an isolating material.

A electrolytic capacitor, where the isolating material is an electrically isolating material or a chemically isolating material.

A electrolytic capacitor, isolating material is an electrically and chemically isolating material.

A electrolytic capacitor, where a glass transition temperature of the isolating material is higher than a maximum operating temperature of the capacitor.

A electrolytic capacitor, where a breakdown voltage of the isolating materials higher than a maximum operating voltage of the capacitor.

A electrolytic capacitor, where the isolating material is configured to sustain vibrations from the capacitor.

A capacitor comprising: a sealed case; external terminals; and a spirally-wound roll of electrode foils enclosed within the sealed case, where each electrode foil is electrically coupled to at least one of the external terminals and where each electrode foil comprises: dielectric layers disposed on at least one surface of the electrode foil; and an isolating coating on at least one edge of the electrode foil.

A capacitor, where the dielectric layers are impregnated with an electrolyte.

A capacitor, where the at least one edge of the electrode foil is a long edge of the electrode foil.

A capacitor, where at least one electrode foils is configured as an anode of the capacitor or a cathode of the capacitor.

A capacitor, where the isolating coating comprises an electrically isolating material or a chemically isolating material.

A capacitor, where the isolating coating comprises an electrically and chemically isolating material.

A capacitor, further comprising tabs that connect electrode foils to the external terminals.

A capacitor, where electrode foils comprises aluminum.

A capacitor, where a glass transition temperature of the isolating coating higher than a maximum operating temperature of the capacitor.

A capacitor, where a breakdown voltage of the isolating coating is higher than a maximum operating voltage of the capacitor.

A capacitor, where the isolating coating is configured to dampen vibrations from the case affecting the spirally-wound roll.

A method of manufacturing of a capacitor, comprising: forming electrode foils, where each electrode foil comprises dielectric layers on at least one surface of the electrode foil and an isolating material on at least one edge of the electrode foil; spirally winding electrode foils to form a roll; coupling electrode foils to external terminals of the capacitor; and enclosing the roll within a sealed case.

A method of manufacturing, further comprising forming the isolating material on the at least one edge of the electrode foil by coating or depositing.

A method of manufacturing, where the at least one edge of the electrode foil is a longer edge of the electrode foil.

A method of manufacturing, where the forming electrode foils comprise: slitting a foil; and covering at least one edge of the foil with an isolating material, where the edge was formed by the slitting.

A method of manufacturing, where the forming electrode foils comprise slitting a combined foil, where the combined foil comprises interleaving bands of conducting material and strips of isolating material, and where the slitting is configured to cut the strips of isolating material into two sub-strips.

A method of manufacturing, where the combined foil is produced by three-dimensional printing of the bands of conducting material and the strips of isolating material.

A method of manufacturing, where the forming electrode foils comprise: slitting a foil; and coating at least one edge of the foil with the isolating material, where the edge was formed by the slitting, where the isolating material comprises an adhesive material, and where the coating comprises adhering the isolating material to the at least one edge.

A method of manufacturing, where the coupling electrode foils to external terminals comprises electrically connecting conducting tabs to electrode foils and the external electrodes.

A method of manufacturing, where a glass transition temperature of the isolating material is higher than a maximum operating temperature of the capacitor;

A method of manufacturing, where a breakdown voltage of the isolating material is higher than a maximum operating voltage of the capacitor.

A method of manufacturing, where the isolating material is configured to sustain vibrations from the capacitor.

A method of manufacturing, where a glass transition temperature of the isolating coating is higher than a maximum operating temperature of the capacitor; where a breakdown voltage of the isolating coating is higher than a maximum operating voltage of the capacitor; and where the isolating coating is adapted to sustain vibrations from the capacitor.

The invention claimed is:

1. A composite electrode foil roll for manufacturing an electrolytic capacitor, comprising:
   bands of electrode foils; and
   strips of an isolating material positioned along a width of the composite electrode foil roll at a plurality of locations, wherein the plurality of locations are at equal distances and correspond to a length of an inner cavity of a case of the electrolytic capacitor;
   wherein the bands of electrode foils and the strips of the isolating material are alternating.

2. The composite electrode foil roll of claim 1, wherein at least one of the bands of electrode foils is configured as an anode or a cathode.

3. The composite electrode foil roll of claim 1, wherein the bands of electrode foils comprise aluminum.

4. The composite electrode foil roll of claim 1, wherein the isolating material comprises an electrically isolating material.

5. The composite electrode foil roll of claim 1, wherein the isolating material comprises a chemically isolating material.

6. The composite electrode foil roll of claim 1, wherein the isolating material comprises an electrically and chemically isolating material.

7. A method of manufacturing a composite electrode foil roll for manufacturing an electrolytic capacitor, comprising:
   alternating bands of electrode foils and strips of an isolating material, wherein the strips are positioned along a width of the composite electrode foil roll at repeated locations, and wherein the repeated locations are at equal distances corresponding to a length of an inner cavity of a case of the electrolytic capacitor.

8. The method of claim 7, further comprising configuring the at least one of the bands of electrode foils as an anode or a cathode.

9. The method of claim 7, wherein at least one of the bands of electrode foils comprises aluminum.

10. The method of claim 7, wherein the isolating material comprises an electrically isolating material or a chemically isolating material.

11. The method of claim 7, wherein the isolating material comprises an electrically and chemically isolating material.

12. The method of claim 7, wherein the composite electrode foil roll is manufactured using a printing process.

13. The method of claim 7, wherein the composite electrode foil roll is manufactured using a molding process.

14. The method of claim 7, wherein the composite electrode foil roll is manufactured using a rolling process.

15. The method of claim 7, wherein the composite electrode foil roll is manufactured using an extrusion process.

* * * * *